March 18, 1952 K. M. FEIERTAG ET AL 2,589,999
DYNAMOELECTRIC MACHINE
Filed April 27, 1951
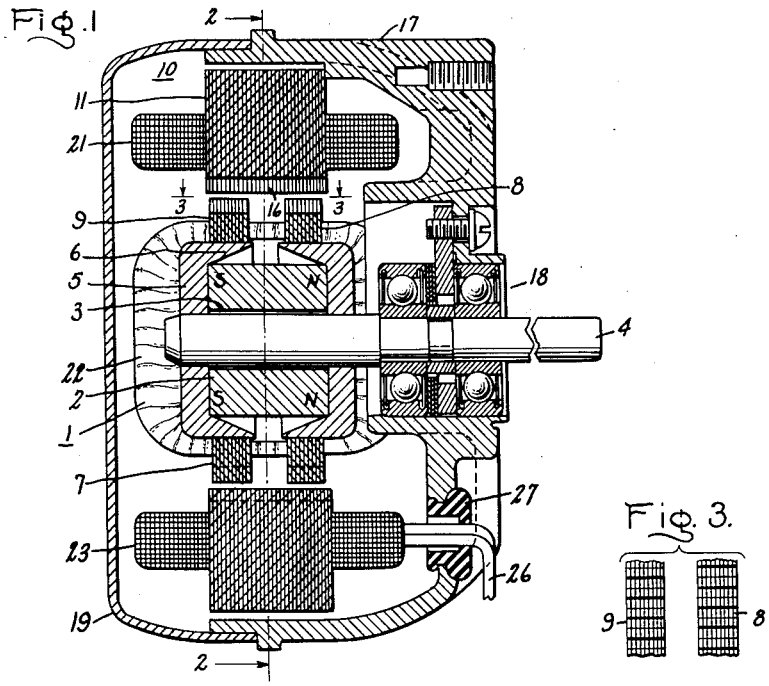
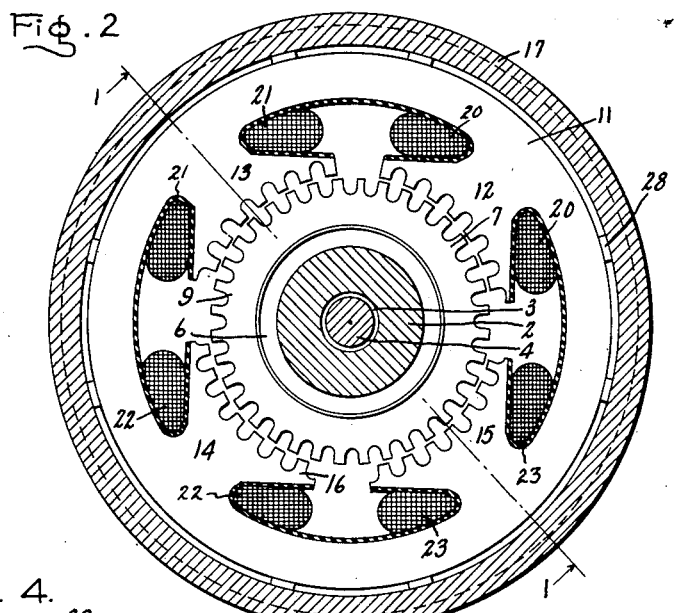
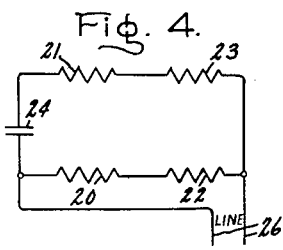
Inventors
Karl M Feiertag
Joe T. Donahoo
by Ernest C. Britton
Their Attorney Patented Mar. 18, 1952

2,589,999

UNITED STATES PATENT OFFICE 2,589,999

DYNAMOELECTRIC MACHINE

Karl M. Feiertag and Joe T. Donahoo, Fort Wayne, Ind., assignors to General Electric Company, a corporation of New York Application April 27, 1951, Serial No. 223,492

7 Claims. (Cl. 172—275)

This invention relates to dynamoelectric machines and, more particularly, to machines of the synchronous inductor type utilizing a permanent magnet for excitation.

Synchronous inductor motors utilizing permanent magnets for excitation have been well known in the art. However, these machines have been frequently characterized by low torque, difficult assembly with resultant high manufacturing cost, and reverse torque characteristics.

It is, therefore, desirable in the design of a motor of this type to provide a construction which will overcome these objections. In previous designs, two separate stackings of stator laminations have been used with a steel shell serving as a flux return path. In order to reduce cost, it is desirable to use a non-magnetic case, such as a die cast part, and this invention, therefore, provides a synchronous inductor machine utilizing a single continuously stacked laminated stator which permits the utilization of a die cast shell.

An object of this invention is to provide an improved synchronous inductor motor characterized by its ease of assembly, reduced cost, and by its improved torque characteristics.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention contemplates a synchronous inductor type of dynamoelectric machine having a rotor assembly comprising a cylindrical permanent magnet polarized axially with a pair of annular spider members respectively abutting the axial ends of the permanent magnet. A pair of laminated rotor core members are respectively mounted on the outer peripheries of the spider members and an equal number of evenly spaced teeth are formed on the outer peripheries of these rotor core members. A single continuously stacked laminated stator core is provided surrounding the rotor assembly and spanning both of the rotor core members. A plurality of polar projections extend radially inward from the stator core defining air gaps with the rotor core members and an equal number of evenly spaced teeth are formed on the inner peripheries of each of the polar projections. Field exciting windings are arranged on the polar projections and the laminated stator core member is mounted in a non-magnetic case.

In the drawing, Fig. 1 is a side elevational view, partly in section, taken along the line 1—1 of Fig. 2, illustrating the improved synchronous inductor dynamoelectric machine of this invention; Fig. 2 is a cross-sectional view of the machine of Fig. 1 taken along the line 2—2 of Fig. 1; Fig. 3 is a fragmentary view of the rotor of the machine of this invention showing the angular displacement of the teeth; and Fig. 4 is a schematic illustration of the connection of the field exciting windings of the motor of Figs. 1 and 2.

Referring now to Fig. 1, there is shown a rotor assembly 1 comprising a cylindrical permanent magnet 2, polarized axially as shown. The permanent magnet 2 is preferably cast with a cylindrical opening 3 therethrough to accommodate shaft 4, which is preferably formed of non-magnetic material. A pair of annular spider members 5 formed of magnetic material are respectively mounted on the shaft 4 by a tight press fit and respectively abut the ends of the permanent magnet 2. It will thus be readily apparent that the permanent magnet 2 is supported by the spider members 5 so that only the axial ends need be machined, the outer and inner peripheries being used as cast. The spider members 5 are respectively provided with annular flange portions 6 formed at their outer peripheries on which are respectively mounted annular laminated rotor core members 7 and 8. Each of the rotor core members 7 and 8 is provided with an equal number of evenly spaced teeth 9 formed on their outer peripheries. It will be readily apparent that the washer-shaped steel punchings which comprise the laminations of the rotor core members 7 and 8 are prepunched to form the teeth 9 and may be held together in any suitable manner, as by suitable rivets (not shown). The assembled rotor core members 7 and 8 are preferably held in place on the spider flanges 6 by a press fit. It will also be readily apparent that in the event that a magnetic shaft is used rather than the non-magnetic shaft 4, the spiders 5 and the permanent magnet 2 may be suitably magnetically insulated from the shaft to prevent short-circuiting of the flux.

The stator assembly 10 comprises a single continuously stacked laminated stator core member 11 surrounding the rotor assembly 1 and spanning the two rotor core members 7 and 8. The stator core member 11 is provided with a plurality of polar projections, shown here as four, extending radially inward. As shown in Fig. 2, polar projections 12, 13, 14 and 15 each have an equal number of evenly spaced teeth 16 formed on their inner peripheries thus defining air gaps with the teeth 9 of the rotor core members 7 and 8. The stator core member 11 is mounted in a non-magnetic, for example die cast, casing 17 in which bearings 18 are suitably mounted for rotatably supporting the shaft 4. Cover 19 may be provided to complete the enclosure. Suitable field exciting windings 20, 21, 22, and 23 are respectively arranged on the polar projections 12, 13, 14, and 15. In order to provide for single phase starting of this motor, the field windings 20, 21, 22, and 23 are connected as shown in Fig. 3 with capacitor 24 providing the necessary phase displacement. Lead wires 26 from the field windings 20, 21, 22, and 23 are brought out through the casing 17 through a suitable bushing 27. The stator core member 11 is preferably pressed into and held central in the non-magnetic casing 17 by means of lands 28.

Referring now to Fig. 2, it will be seen that the stator teeth 16 are provided with the same tooth pitch as the rotor teeth 9, i. e., the angular distance from the center of one tooth to the center of the next. It will also be observed that the teeth 16 on each of the polar projections are advanced one-quarter tooth pitch from the teeth on the preceding pole, i. e., the teeth on the polar projection 13 are advanced one-quarter tooth pitch from the teeth on the polar projection 12. The teeth 9 of the rotor core members 7 and 8 are angularly displaced with the teeth of the rotor core member 7 being displaced from those on the rotor core member 8 by one-half tooth pitch, as shown in Fig. 3.

It will be noted that field windings 20 and 22 are wound on diametrically opposite poles 12 and 14 are directly excited from a source of alternating current through line 26 and that windings 21 and 23 on poles 13 and 15 are excited through capacitor 24. Thus, windings 20 and 22 produce instantaneous north and instantaneous south polarities on polar projections 12 and 14 respectively. Thus, when poles 12 and 14 are at maximum excitation, poles 13 and 15 are at zero excitation. With the permanent magnet 2 polarized as shown in Fig. 1, the rotor core member 7 will be polarized south and the rotor core member 8 will be polarized north. Thus, upon application of excitation to the field windings, assuming the teeth of pole 12 to be instantaneously magnetized with a north polarity, the rotor will be magnetically satisfied as shown in Fig. 2, since the teeth 9 of rotor core member 7, being polarized south, will be attracted into full alignment with the teeth 16 of pole 12, as shown in Fig. 2. Conversely, the teeth of polar projection 14 being instantaneously polarized south repel the similarly polarized teeth 9 of rotor core member 7. Since there is a half tooth pitch difference between the teeth 16 of polar projection 14 and the teeth of polar projection 12, it will be seen that at this instant the teeth 9 of rotor core member 7 will be positioned immediate the teeth 16 of stator polar projection 14. At this instant, by virtue of the capacitor 24 which provides a substantially 90° electrical phase displacement between the windings 20 and 22, and the windings 21 and 23, the polar projections 13 and 15 will be at zero excitation and thus exerting no influence on the rotor teeth adjacent thereto. As the cycle of the supply current changes, however, the excitation in the polar projections 12 and 14 decays and builds up correspondingly in projections 13 and 15, thus causing an attraction between the teeth of the pole 15, which is now polarized north, and the teeth of rotor core member 7 so that they are attracted into alignment. A repulsion between the teeth of polar projection 13 and the teeth 9 of rotor core member 7 is also evidenced, thus producing a ¼ tooth pitch movement of the rotor. This movement then continues with the rotor advancing one-quarter tooth pitch for each one-quarter cycle change. Thus, a motor having 36 rotor teeth will run at 100 R. P. M. on 60 cycles. It will also be readily apparent that this action also simultaneously takes place due to the cooperation of the rotor core member 8 and the stator polar projections. Since the rotor core member 8 is of opposite polarity from the core member 7, and, as described above, is advanced one-half tooth pitch therefrom, this action takes place 180 mechanical degrees from that of rotor 9.

It will now be readily apparent that this invention provides an improved construction for a synchronous inductor machine wherein the return path for the permanent magnet flux is through the stator punchings rather than through a shell formed of magnetic material. It will also be seen that the provision of four stator poles having their teeth displaced by ¼ tooth pitch on each successive pole provides an improved and smoothly operating motor which is not subject to reverse torque characteristics and in which the application of torque impulses is symmetrical.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What we claim as new and desire to secure by Letters Patent of the United States is:

1. In a dynamoelectric machine of the synchronous inductor type, a rotor assembly comprising a cylindrical permanent magnet polarized axially, a pair of annular spider members formed of magnetic material and respectively abutting the axial ends of said permanent magnet, and a pair of annular laminated rotor core members respectively mounted on the outer peripheries of said spider members, said rotor core members respectively having an equal number of evenly spaced teeth formed on their outer peripheries; and a stator assembly comprising a single continuously stacked laminated stator core member surrounding said rotor member and spanning both of said rotor core members, said stator core member having a plurality of polar projections extending radially inward and defining air gaps with said rotor core members, said polar projections respectively having an equal number of evenly spaced teeth formed on their inner peripheries.

2. In a dynamoelectric machine of the synchronous inductor type, a rotor assembly comprising a cylindrical permanent magnet polarized axially and having an opening formed therein for receiving a shaft, a pair of annular spider members adapted to be mounted on said shaft, said spider members being formed of magnetic material and respectively abutting the axial ends of said permanent magnet, and a pair of annular laminated rotor core members respectively mounted on the outer peripheries of said spider members, said rotor core members respectively having an equal number of evenly spaced teeth formed on their outer peripheries; and a stator assembly comprising a single continuously stacked laminated stator core member surrounding said rotor member and spanning both of said rotor core members, said stator member having a plurality of polar projections extending radially inward and defining air gaps with said rotor core members, said polar projections respectively having an equal number of evenly spaced teeth formed on their inner peripheries.

3. In a dynamoelectric machine of the synchronous inductor type, a rotor assembly mounted on a shaft formed of non-magnetic material and comprising a cylindrical permanent magnet polarized axially and having an opening formed therein for receiving said shaft, a pair of annular spider members mounted on said shaft, said spider members being formed of magnetic material and respectively abutting the axial ends of said permanent magnet, and a pair of annular laminated rotor core members respectively mounted on the outer peripheries of said spider members, said rotor core members respectively having an equal number of evenly spaced teeth formed on their outer peripheries; and a stator assembly comprising a single continuously stacked laminated stator core member surrounding said rotor member and spanning both of said rotor core members, said stator core member having a plurality of polar projections extending radially inward and defining air gaps with said rotor core members, said polar projections respectively having an equal number of evenly spaced teeth formed on their inner peripheries, field exciting windings respectively arranged on said polar projections, and a casing member formed of non-magnetic material for supporting said stator core.

4. In a dynamoelectric machine of the synchronous inductor type, a rotor assembly comprising a cylindrical permanent magnet polarized axially, a pair of annular spider members formed of magnetic material respectively abutting the axial ends of said permanent magnet, and a pair of annular laminated rotor core members respectively mounted on the outer peripheries of said spider members, said rotor core members respectively having an equal number of evenly spaced teeth formed on their outer peripheries, the teeth of one of said rotor core members being displaced angularly from the teeth of the other of said rotor core members by one-half tooth pitch; and a stator assembly comprising a single continuously stacked laminated stator core member surrounding said rotor member and spanning both of said rotor core members, said stator core member having a plurality of polar projections extending radially inward and defining air gaps with said rotor core members, said polar projections respectively having an equal number of evenly spaced teeth formed on their inner peripheries, said last named teeth having the same tooth pitch as said rotor core member teeth.

5. In a dynamoelectric machine of the synchronous inductor type, a rotor assembly comprising a cylindrical permanent magnet polarized axially, a pair of annular spider members formed of magnetic material respectively abutting the axial ends of said permanent magnet, and a pair of annular laminated rotor core members respectively mounted on the outer peripheries of said spider members, said rotor core members respectively having an equal number of evenly spaced teeth formed on their outer peripheries, the teeth of one of said rotor core members being displaced angularly from the teeth of the other of said rotor core members by one-half tooth pitch; and a stator assembly comprising a single continuously stacked laminated stator core member surrounding said rotor member and spanning both of said rotor core members, said stator core member having a plurality of polar projections extending radially inward and defining air gaps with said rotor core members, said polar projections respectively having an equal number of evenly spaced teeth formed on their inner peripheries, said last named teeth having the same tooth pitch as said rotor core member teeth, the teeth on each one of said polar projections being advanced one-quarter tooth pitch from the teeth on the succeeding one of said polar projections.

6. In a dynamoelectric machine of the synchronous inductor type, a rotor assembly comprising a cylindrical permanent magnet polarized axially, a pair of annular spider members formed of magnetic material and respectively abutting the axial ends of said permanent magnet, and a pair of annular laminated rotor core members respectively mounted on the outer peripheries of said spider members, said rotor core members respectively having an equal number of evenly spaced teeth formed on their outer peripheries, the teeth of one of said rotor core members being displaced angularly from the teeth of the other of said rotor core members by one-half tooth pitch; and a stator assembly comprising a single continuously stacked laminated stator core member surrounding said rotor member and spanning both of said rotor core members, said stator core member having four polar projections extending radially inward and defining air gaps with said rotor core members, said polar projections respectively having an equal number of evenly spaced teeth formed on their inner peripheries, said last named teeth having the same tooth pitch as said rotor core member teeth, the teeth on each one of said polar projections being advanced one-quarter tooth pitch from the teeth on the succeeding one of said polar projections.

7. In a dynamoelectric machine of the synchronous inductor type, a rotor assembly comprising a permanent magnet polarized axially, a pair of members respectively abutting the axial ends of said permanent magnet and having an equal number of evenly spaced teeth formed on their outer peripheries; and a stator assembly comprising a single continuously stacked laminated stator core assembly surrounding said rotor member and spanning said rotor teeth, said stator core member having a plurality of polar projections extending radially inward and defining air gaps with said rotor teeth, said polar projections respectively having a plurality of evenly spaced teeth formed on their inner peripheries, said stator teeth having the same tooth pitch as said rotor core member teeth.

KARL M. FEIERTAG.
JOE T. DONAHOO.

No references cited.